United States Patent
Garimella et al.

(10) Patent No.: US 10,592,615 B2
(45) Date of Patent: Mar. 17, 2020

(54) COLLABORATIVE VIRTUAL MECHANICAL ROUTING DEVELOPMENT SYSTEM AND METHOD

(71) Applicant: SIEMENS PRODUCT LIFECYCLE MANAGEMENT SOFTWARE INC., Plano, TX (US)

(72) Inventors: Raman Garimella, Tustin, CA (US); Abraham George, Loveland, OH (US); Wynn Niblack, Saint Charles, MO (US); Douglas Peters, Portland, OR (US)

(73) Assignee: Siemens Industry Software Inc., Plano, TX (US)

(*) Notice: Subject to any disclaimer, the term of this patent is extended or adjusted under 35 U.S.C. 154(b) by 1120 days.

(21) Appl. No.: 14/813,861

(22) Filed: Jul. 30, 2015

(65) Prior Publication Data

US 2017/0032057 A1    Feb. 2, 2017

(51) Int. Cl.
    *G06F 17/50*      (2006.01)

(52) U.S. Cl.
    CPC ...... *G06F 17/5004* (2013.01); *G06F 17/5086* (2013.01); *G06F 17/5095* (2013.01); *G06F 2217/04* (2013.01); *G06F 2217/34* (2013.01)

(58) Field of Classification Search
None
See application file for complete search history.

(56) References Cited

U.S. PATENT DOCUMENTS

| | | | |
|---|---|---|---|
| 8,823,751 B2 * | 9/2014 | Ghantous | G06T 19/20 345/630 |
| 8,984,016 B2 * | 3/2015 | Marquez | G06F 17/5018 707/793 |

(Continued)

FOREIGN PATENT DOCUMENTS

| | | |
|---|---|---|
| JP | H0773224 A | 3/1995 |
| JP | H07103400 A | 4/1995 |

(Continued)

OTHER PUBLICATIONS

Huang Zhizhang et al., "Computer-Aided Engineering for CANDU Projects", 98-xxxxx-CJNPE, Jan. 1, 2005, Retrieved from Internet: URL:http://www.nuceng.ca/canteachmirror/library/20054410.pdf, pp. 1-18.

(Continued)

*Primary Examiner* — Rehana Perveen
*Assistant Examiner* — Cuong V Luu

(57) ABSTRACT

A system and method is provided that facilitates collaborative development of virtual mechanical routing. A processor of the system responsive to inputs provided through at least one input device may generate a design for a routing run comprised of a set of elements and cause a distributed routing path corresponding to the routing run to be stored in a data store. The distributed routing path may be comprised of data that specifies two end elements and a plurality of routing path links that specify connections between a plurality of intermediate elements and between each end element and a respective one of the intermediate elements. The (Continued)

processor may also cause a display device to output a 3D representation of the routing run based at least in part on the distributed routing path stored in the data store, and data representative of the physical structures of the end elements and the intermediate elements that are specified by the routing path links of the distributed routing path.

18 Claims, 12 Drawing Sheets

(56) References Cited

U.S. PATENT DOCUMENTS

| | | | |
|---|---|---|---|
| 9,378,582 B2* | 6/2016 | Slavin, III | G06T 15/20 |
| 2006/0190221 A1* | 8/2006 | Bennett | G06F 17/5004 |
| | | | 703/1 |
| 2006/0265496 A1* | 11/2006 | Freitag | G06F 17/50 |
| | | | 709/224 |
| 2007/0186094 A1* | 8/2007 | Ghantous | G06F 17/509 |
| | | | 713/153 |
| 2007/0260432 A1 | 11/2007 | Okada | |
| 2008/0275674 A1* | 11/2008 | Reghetti | G06F 17/5004 |
| | | | 703/1 |
| 2009/0119071 A1* | 5/2009 | Ghantous | G06F 17/5004 |
| | | | 703/1 |
| 2009/0326876 A1* | 12/2009 | Miller | G06F 17/50 |
| | | | 703/1 |
| 2010/0094598 A1 | 4/2010 | Okada et al. | |
| 2011/0238387 A1* | 9/2011 | Miyake | G06F 17/509 |
| | | | 703/1 |
| 2011/0270581 A1* | 11/2011 | Kelly | G06F 17/50 |
| | | | 703/1 |
| 2013/0238508 A1 | 9/2013 | Kok et al. | |
| 2014/0244219 A1* | 8/2014 | Pappoppula | G06F 17/5004 |
| | | | 703/1 |

FOREIGN PATENT DOCUMENTS

| | | |
|---|---|---|
| JP | 2005108014 A | 4/2005 |
| JP | 2011008555 A | 1/2011 |
| JP | 2011180855 A | 9/2011 |
| WO | 2011087501 A1 | 7/2011 |
| WO | 2013134593 A1 | 9/2013 |

OTHER PUBLICATIONS

PCT International Search Report and Written Opinion dated Oct. 7, 2016 corresponding at PCT Application No. PCT/US2016/042879 filed Jul. 19, 2016 (16 pages).

Japanese Office Action dated Mar. 11, 2019, for JP Application No. 2018-504718, 2 pages.

* cited by examiner

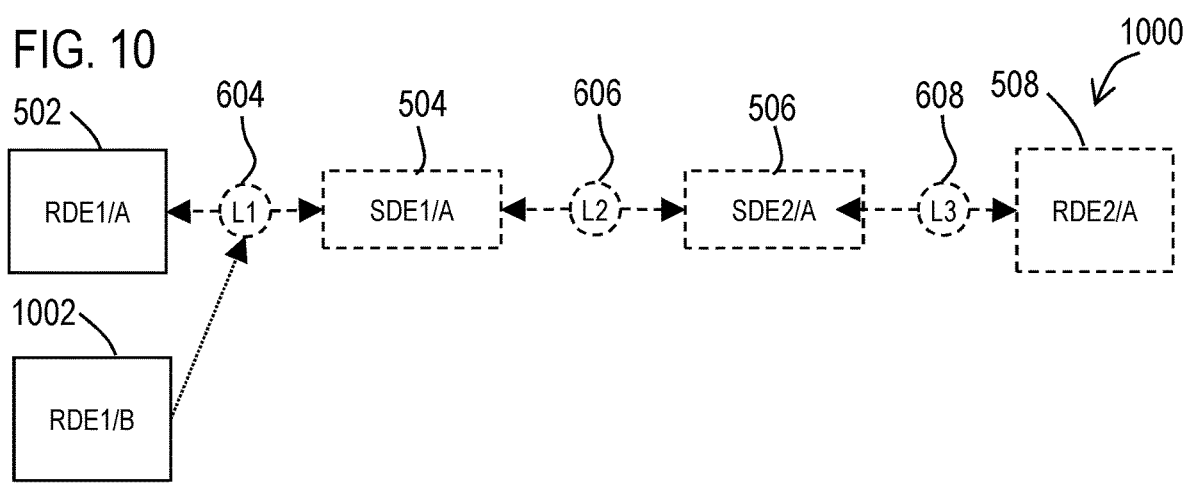
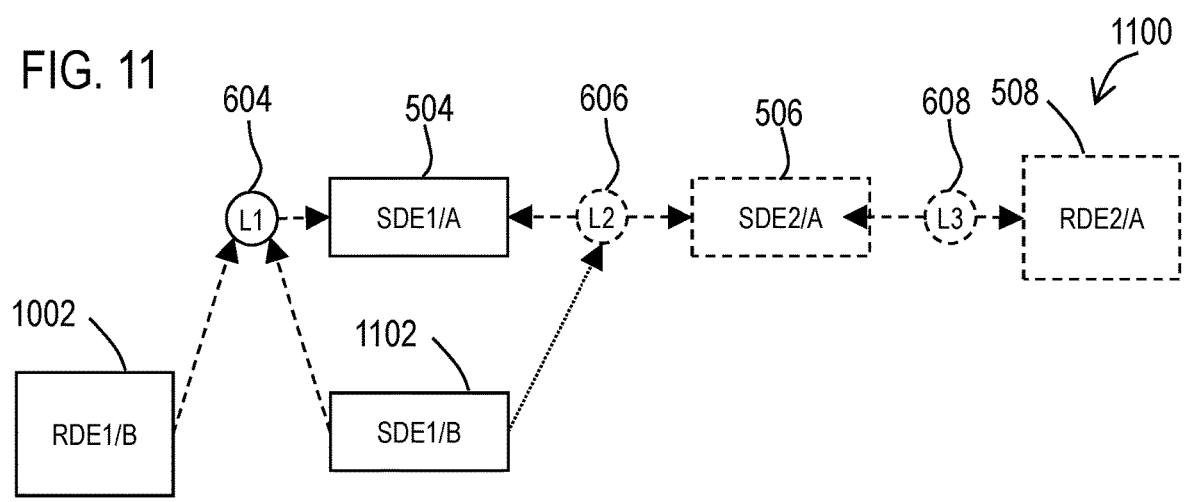
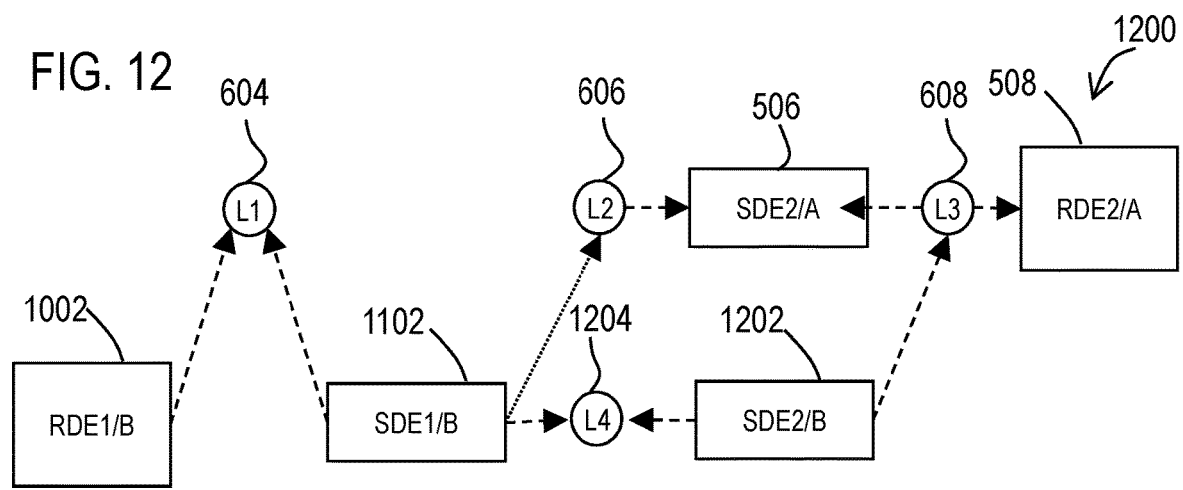

COLLABORATIVE VIRTUAL MECHANICAL ROUTING DEVELOPMENT SYSTEM AND METHOD

TECHNICAL FIELD

The present disclosure is directed, in general, to computer-aided design (CAD), visualization, and manufacturing systems, product data management (PDM) systems, product lifecycle management (PLM) systems, and similar systems, that are used to create and manage data for products and other items (collectively referred to herein as product systems).

BACKGROUND

PLM systems may include components that facilitate the design of product structures. Such components may benefit from improvements.

SUMMARY

Variously disclosed embodiments include systems and methods that may be used to collaboratively develop a three dimensions (3D) virtual mechanical routing system. In one example, a system may comprise at least one processor configured to be responsive to inputs provided through at least one input device to generate a design for a routing run comprised of a set of elements and cause a distributed routing path corresponding to the routing run to be stored in a data store. The distributed routing path may be comprised of data that specifies two end elements and a plurality of routing path links that specify connections between a plurality of intermediate elements and between each end element and a respective one of the intermediate elements. In addition, the at least one processor may be configured to cause a display device to output a 3D representation of the routing run based at least in part on the distributed routing path stored in the data store, and data representative of the physical structures of the end elements and the intermediate elements that are specified by the routing path links of the distributed routing path.

In another example, a method may include various acts carried out through operation of at least one processor. Such a method may include through operation of at least one processor responsive to inputs provided through at least one input device, generating a design for a routing run comprised of a set of elements and causing a distributed routing path corresponding to the routing run to be stored in a data store, which distributed routing path may be comprised of data that specifies two end elements and a plurality of routing path links that specify connections between a plurality of intermediate elements and between each end element and a respective one of the intermediate elements. The method may also include through operation of the at least one processor, causing a display device to output a 3D representation of the routing run based at least in part on the distributed routing path stored in the data store and data representative of the physical structures of the end elements and the intermediate elements that are specified by the routing path links of the distributed routing path.

A further example may include non-transitory computer readable medium encoded with executable instructions (such as a software component on a storage device) that when executed, causes at least one processor to carry out this describe method.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the Detailed Description below, it may be advantageous to set forth definitions of certain words or phrases that may be used throughout this patent document. For example, the terms "include" and "comprise," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to describe various elements, functions, or acts, these elements, functions, or acts should not be limited by these terms. Rather these numeral adjectives are used to distinguish different elements, functions or acts from each other. For example, a first element, function, or act could be termed a second element, function, or act, and, similarly, a second element, function, or act could be termed a first element, function, or act, without departing from the scope of the present disclosure.

In addition, phrases such as "processor is configured to" carry out one or more functions or processes, may mean the processor is operatively configured to or operably configured to carry out the functions or processes via software, firmware, and/or wired circuits. For example, a processor that is configured to carry out a function/process may correspond to a processor that is actively executing the software/firmware which is programmed to cause the processor to carry out the function/process and/or may correspond to a processor that has the software/firmware in a memory or storage device that is available to be executed by the processor to carry out the function/process. It should also be noted that a processor that is "configured to" carry out one or more functions or processes, may also correspond to a processor circuit particularly fabricated or "wired" to carry out the functions or processes (e.g., an ASIC or FPGA design). Further the phrase "at least one" before an element (e.g., a processor) that is configured to carry out more than one function may correspond to one or more elements (e.g., processors) that each carry out the functions and may also correspond to two or more of the elements (e.g., processors) that respectively carry out different ones of the one or more different functions.

The term "adjacent to" may mean: that an element is relatively near to but not in contact with a further element; or that the element is in contact with the further portion, unless the context clearly indicates otherwise.

Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

FIGS. 10-12 illustrate example revisions that may be made to a distributed routing path.

DETAILED DESCRIPTION

Figure 1:
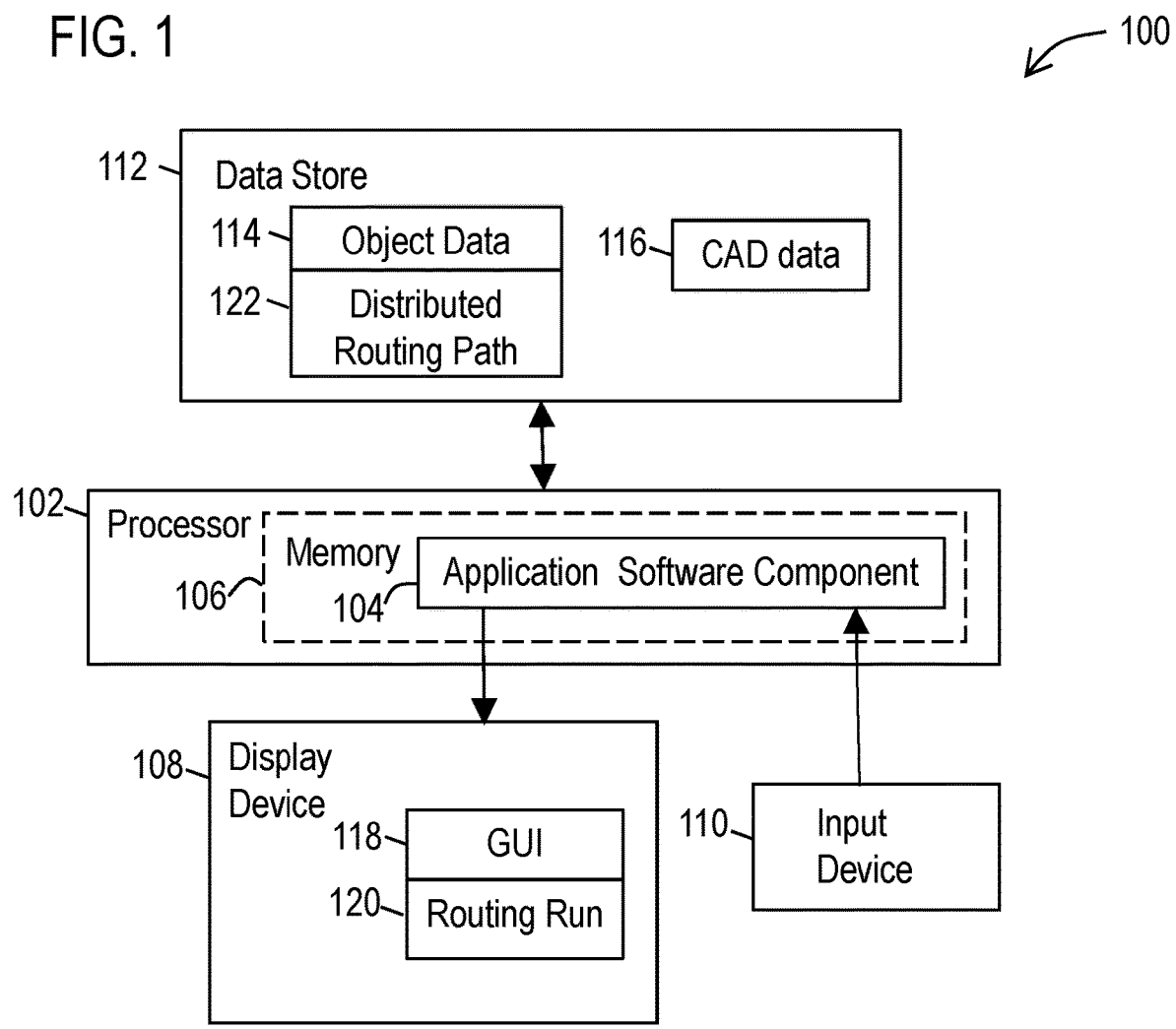
FIG. 1 illustrates a functional block diagram of an example system that facilitates collaborative development of 3D virtual mechanical routing systems.

Various technologies that pertain to systems and methods to develop mechanical routing systems will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

With reference to FIG. 1, an example system 100 that facilitates collaborative development of virtual mechanical routing systems is illustrated. The system 100 may include at least one processor 102 that is configured to execute one or more application software components 104 from a memory 106 in order to carry out the various features described herein. The application software component 104 that carries out the collaborative development may correspond to an independent application comprised of one or more elements and/or may be integrated/included with software that carries out other functions.

For example, the described application software component 104 that carries out features described herein may correspond to or be integrated into CAD/CAM/CAE (computer-aided design/computer-aided manufacturing/computer-aided engineering) software and/or PLM software as well as architectural software, and/or any other type of software that may be used to develop a mechanical routing system. Examples of PLM software and/or CAD/CAM/CAE software that may be adapted to include at least some of the functionality described herein for collaborative development of virtual mechanical routing systems include the Teamcenter PLM and/or NX suites of applications that are available from Siemens Product Lifecycle Management Software Inc. (Plano, Tex.).

The described system may include at least one display device 108 (such as a display screen) and at least one input device 110. For example, the processor may included as part of a PC, notebook computer, workstation, server, tablet, mobile phone, or any other type of computing system. The display device, for example, may include an LCD display, monitor, and/or a projector. The input devices, for example, may include a mouse, pointer, touch screen, touch pad, drawing tablet, track ball, buttons, keypad, keyboard, game controller, camera, motion sensing device that captures motion gestures, or any other type of input device capable of providing the inputs described herein. Also for devices such as a tablet, the processor 102 may be integrated into a housing that includes a touch screen that serves as both an input and display device. Further, it should be appreciated that some input devices (such as a game controller) may include a plurality of different types of input devices (analog stick, d-pad, and buttons).

Also, it should be noted that the processor described herein may be located in a server that is remote from the display and input devices described herein. In such an example, the described display device and input device may be included in a client device that communicates with the server (and/or a virtual machine executing on the server) through a wired or wireless network (which may include the Internet). In some embodiments, such a client device, for example, may execute a remote desktop application or may correspond to a portal device that carries out a remote desktop protocol with the server in order to send inputs from an input device to the server and receive visual information from the server to display through a display device. Examples of such remote desktop protocols include Teradici's PCoIP, Microsoft's RDP, and the RFB protocol. In such examples, the processor described herein may correspond to a virtual processor of a virtual machine executing in a physical processor of the server.

In example embodiments, the system may further include a data store 112. The data store may include object data 114 (specifying elements and relationships between elements of a structure), CAD data 116 (such as CAD files that specify 3D physical shapes and configurations for the structures of the elements), and any other data that may be useful to develop a mechanical routing system. Examples of databases that may be used as one or more data stores described herein include database server applications such as Oracle, Microsoft SQL Server, or any other type of data store that is operative to store data records.

In addition, the described application software component 104 may be capable of producing through the display device 108, an interactive graphical user interface (GUI) 118. The GUI may be used by a user to generate, modify, and display a three dimensional (3D) representation of a mechanical routing system including at least one routing run 120 and the elements that comprise the routing run. Further the GUI may be used to store data in and retrieve data from the data store 112, corresponding to the object data 114 and CAD data 116 for the mechanical routing system including the routing run (as well as other structures). For example, the described GUI 118 may include a GUI of CAD software for use with designing and viewing mechanical routing system via the object and CAD data stored in the data store.

Figure 2:
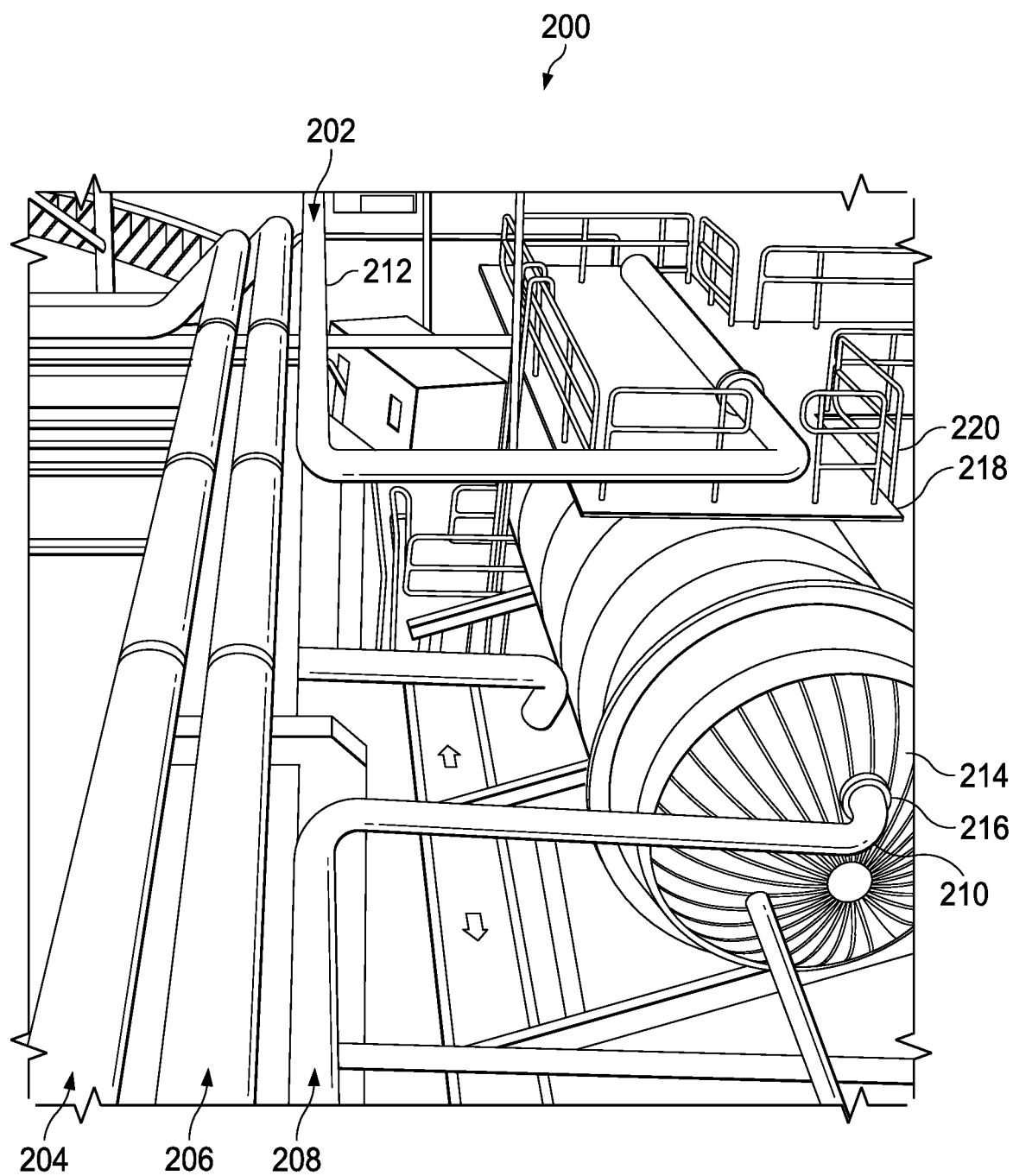
FIG. 2 illustrates an image of an example pipeline mechanical routing system.

FIG. 2 illustrates an image of an example mechanical routing system 200, which is being built in the hull of a ship. Such a mechanical routing system may include multiple pipeline routing runs 202, 204, 206, 208 that involve the flow of fluids (e.g., water, oil, fuel, gases, and other chemicals) through elements such as pipes 210, 212 or ducts that connect equipment 214 (such as reservoirs, engines). Such pipeline routing runs may also include elements such as fittings 216 (e.g., flanges/elbows/tees) and in-line equipment (e.g., valves/pumps) that are used in the construction of these pipelines. In addition, pipeline routing runs may include sensors (e.g., temperature/pressure gauges) and insulation that can be attached or applied to the pipeline at various locations. Further the environmental space around routing runs may include walls, floors 218, railings 220, supports, and other structures. In certain industries such as marine, aerospace, and plant & energy, the design of routing systems may account for a significant amount of the overall design activity for a new ship, rocket, building, chemical plant or nuclear energy plant.

Figure 3:
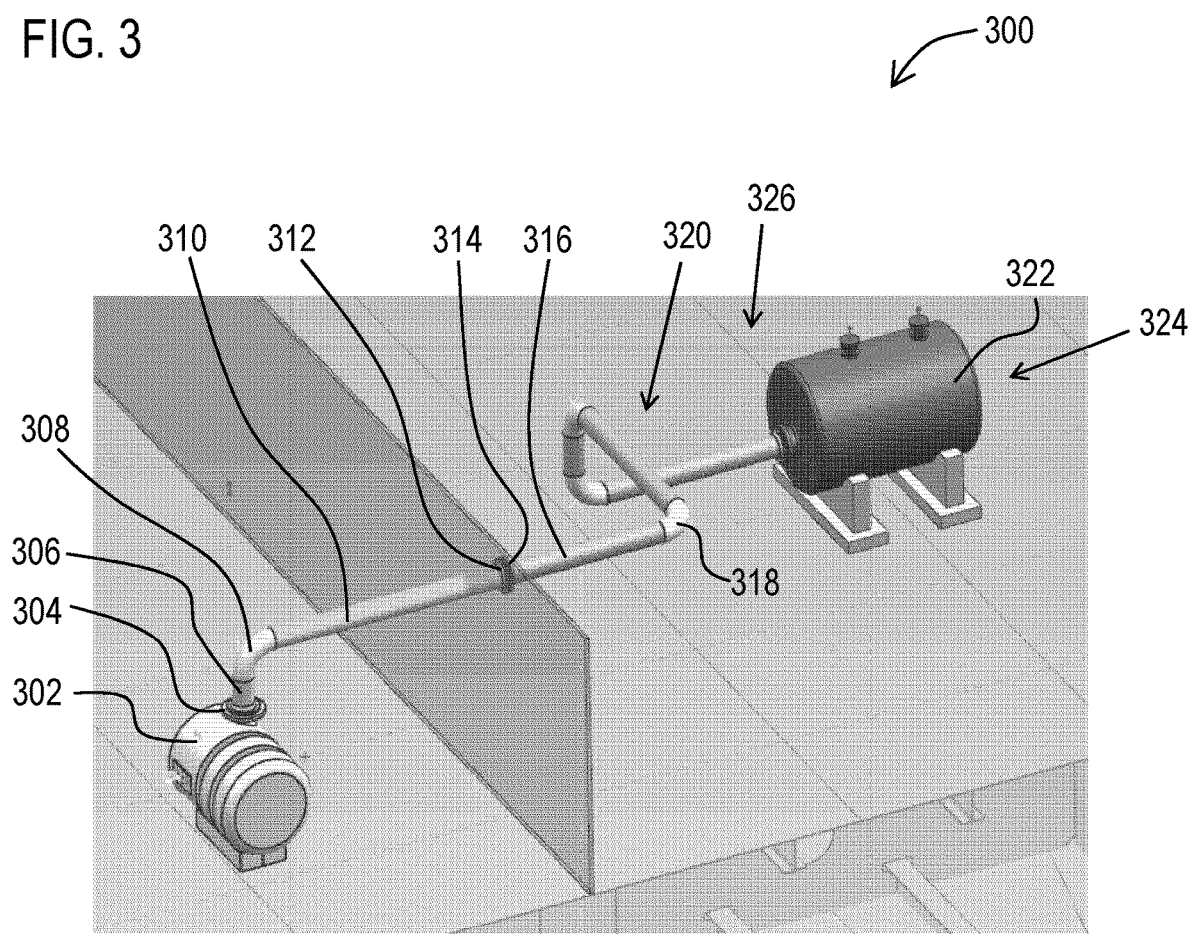
FIG. 3 illustrates an example 3D representation of an example mechanical routing system with a single pipeline routing run.

FIG. 3 illustrates a 3D representation 300 of a physical structure for a mechanical routing system 326 having a single pipeline routing run 324 that may be outputted through a display device via an application software component that includes CAD software executing in the described at least one processor. In this example, the routing run includes two end elements corresponding to items of equipment such as a pump 302 and a tank 322. Between these two end elements are several intermediate elements which are capable of communicating a fluid between the two end elements. In this example, the intermediate elements include a first flange 304, a first pipe 306, a first elbow 308, a second pipe 310, a second flange 312, a third flange 314, a third pipe 316, a second elbow 318, and several additional elements 320.

Figure 4:
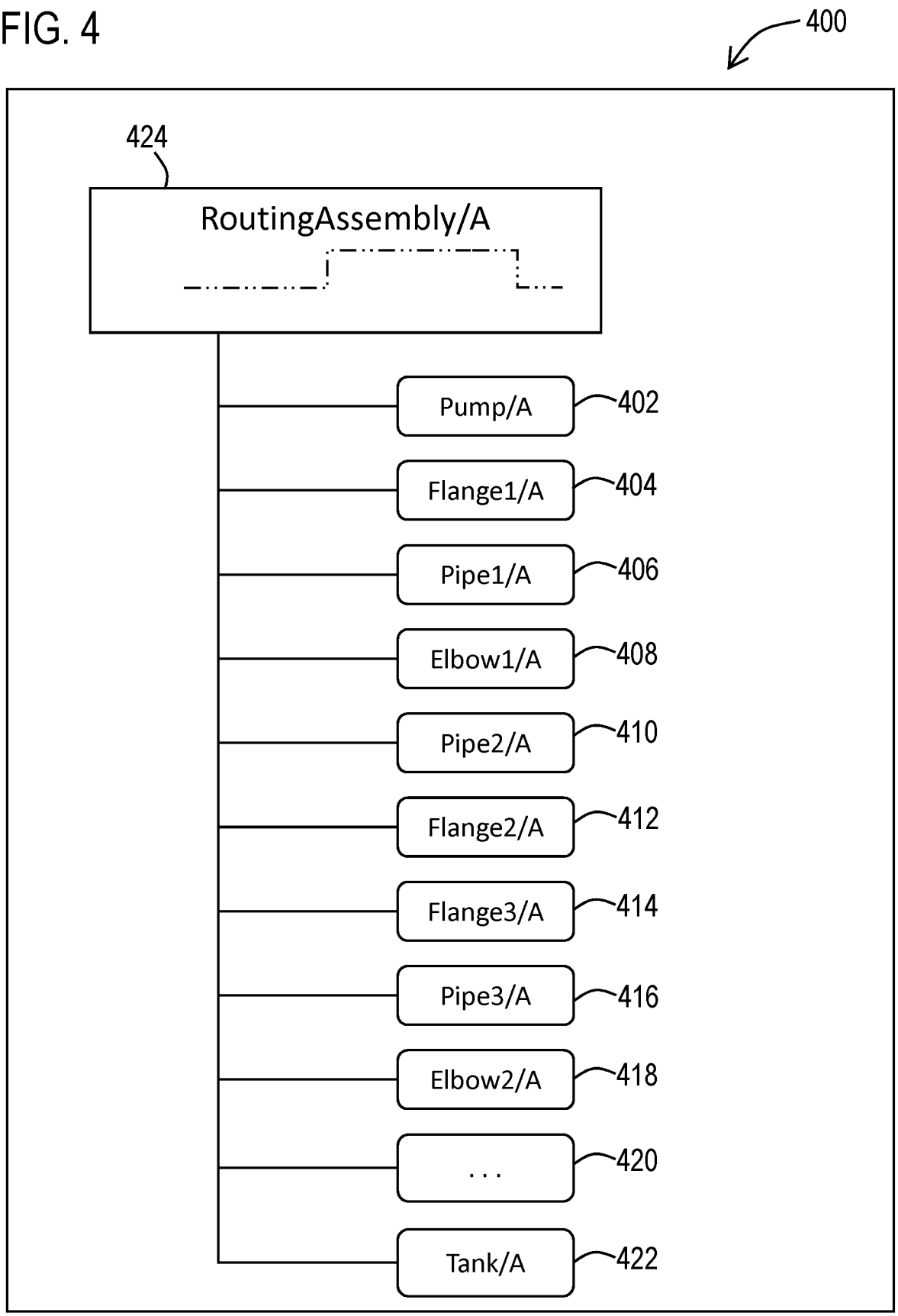
FIG. 4 illustrates an schematic example of a CAD assembly file for the pipeline routing run.

Such a structure could be managed using a routing assembly CAD file. FIG. 4 illustrates a schematic representation of such a CAD file 400 for the pipeline routing run 324 shown in FIG. 3. The single CAD file may also include respective CAD data 402-422 which respectively define 3D visual representations for each of the respective physical elements 302-322 of the mechanical routing run 324 shown in FIG. 3. In this example, the routing assembly CAD file 400 may include a distinct wireframe path 424 that specifically defines the shape of the pipeline. The respective CAD data 402-422 for the 3D elements of the pipeline in the CAD file 400 may be associated in the file with positions along the wireframe path. CAD software may thus open the file and generate a rendering of the pipeline routing assembly by rendering each 3D element associated with the wireframe path and placing the rendered element in a particular position along the wireframe path as specified in the file.

It should be appreciated that when such a routing assembly is being revised, the routing assembly CAD file 400 may need to be locked in order to modify the wireframe path, which would prevent access to other users. When a second configuration of the mechanical routing system is needed having a modified path (e.g., having a second tank) for different applications (e.g., different ship designs), a revised version of the routing assembly CAD file may be generated that includes the additional and/or modified elements for the modified path. Such a revised CAD file may also include a duplication of all of the elements that have not changed (which may be the majority of elements when only a minor revision is made to the routing system).

In order to provide more flexibility when multiple users need to revise different portions of such a mechanical routing system, as illustrated in FIG. 1, an example embodiment may be configured to generate and manipulate a distributed routing path 122 that is stored in the data store 112. With this approach there may be no explicit wireframe routing path that is defined in a controlling element such in the previously described routing assembly CAD file. Instead, the distributed routing path 122 may have a dynamic shape that is dynamically based (when rendered) on the configuration of the elements themselves which are individually linked together in data stored in a data store 112. Such a distributed approach to defining a routing path enables concurrent design of large mechanical routing systems and avoids users having to manage the shape of a routing path explicitly. Rather design changes are performed on the elements themselves and the path will follow as it is comprised of the elements.

For example, with respect to FIG. 1, the at least one processor 102 of the system 100 may include first and a second processors included respectfully in first and second computer systems (e.g., workstations). Each of these processors may be configured to execute first and second instances of the application software component (e.g., including CAD software), such that the first and second computer systems enable different users at the same time to load and make design changes to a different subsets of the elements of the routing run and store corresponding changes to the distributed routing path to the same data store.

In example embodiments, the individual elements that define the distributed routing path may correspond to components and revisions to components stored as individual business objects in the data store 112 (such as a relational database of a PLM system). Each of the elements may have their own independent lifecycle and the ability to be configured in a bill of materials. Examples of a PLM framework that may be used to manage business objects for the routing system elements described herein may be found in US Publication No. 2013238508 published Sep. 12, 2013, which is hereby incorporated herein by reference in its entirety.

Figure 5:
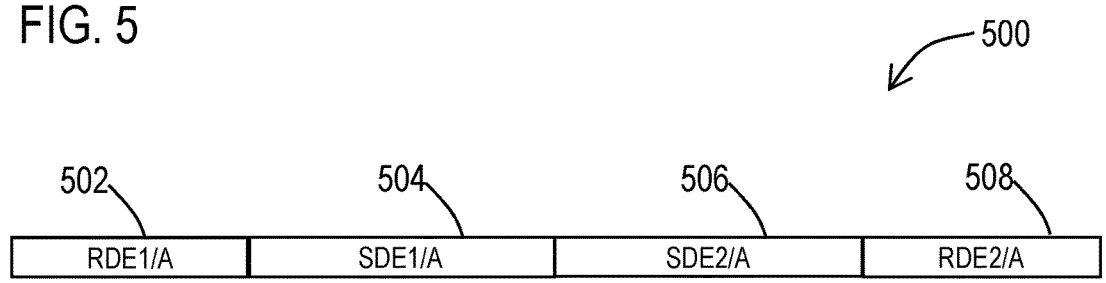
FIG. 5 illustrates a schematic representation of an example mechanical routing run.

In example embodiments, to store a distributed routing path as data in a data store, the data store may include several structures (such as tables) which collectively are usable to store the relationships that are to be used to form (and determine) a distributed routing path. FIG. 5 illustrates a schematic representation of an example routing run 500 that may be represented in data via the described distributed routing path. In this example, the routing run 500 includes two end elements 502, 508 (RDE1/A, RDE2/A) and two intermediate elements 504, 506 (SDE1/A, SDE2/A) that are connected together and to the end elements. In this example, the two end elements may correspond to equipment (such as the pump and tank described previously) and the intermediate elements may correspond to flanges, pipes, or other pipeline components.

Figure 6:
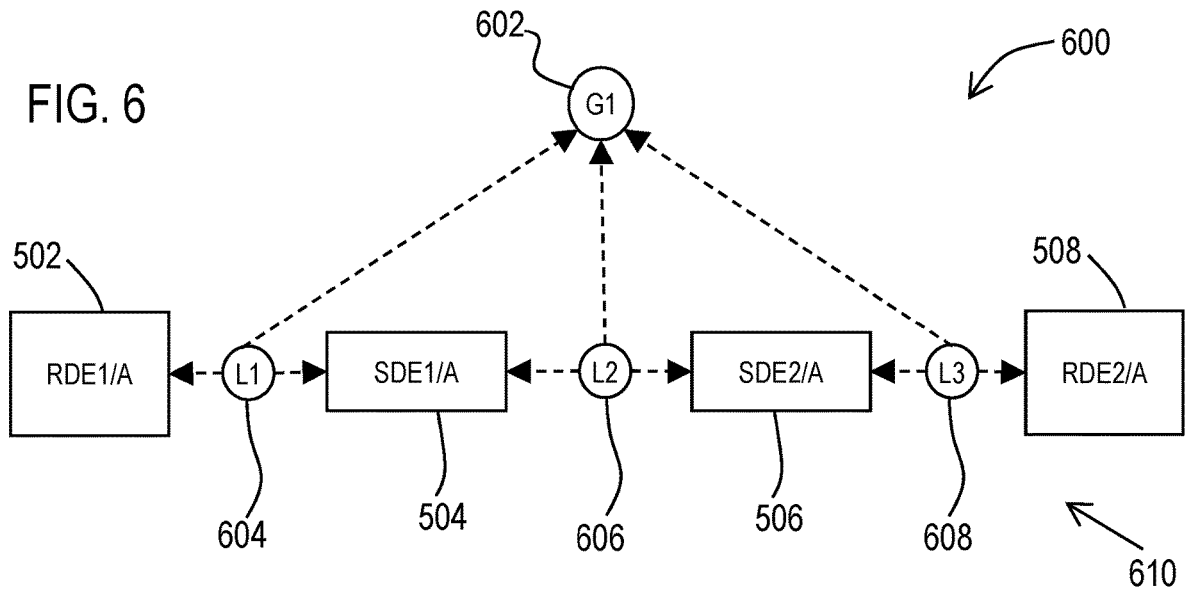
FIGS. 6 and 7 illustrate objects and data records that may comprise a distributed routing path for the example mechanical routing run.

FIG. 6 illustrates an example of a distributed routing path 600 for the routing run 500 shown in FIG. 5. In this illustration, the distributed routing path is shown via a high level set of objects 610 that may be represented by one or more tables and table records stored in the data store. In this example, the data store may be configured to store a routing path group 602 (G1) which specifies the end elements 502, 508 (RDE1/A, RDE2/A) for the distributed routing path. In addition, the data store may be configured to store routing path links 604, 606, 608 (L1, L2, L3) that define associates between pairs of elements that are to be included in the distributed routing path. Such pairs of elements may include the end elements 502, 508 (RDE1/A, RDE2/A) as well as one or more (typically many more) intermediate elements 504, 506 (SDE1/A, SDE2/A). Each of the links 604, 606, 608 (L1, L2, L3) may also specify the particular routing path group 602 (G1) to which they are associated.

Thus to recreate the distributed routing path from this described data, an application software component (such as a CAD software) may be configured to retrieve from the data store the routing path group 602 (G1) for a desired mechanical routing run 500 and the routing path links 604, 606, 608 (L1, L2, L3) that are associated with the routing path group. The application software may use this retrieved data to determine the end elements 502, 508 (RDE1/A, RDE2/A) of the distributed routing path as well as the intermediate elements 504, 506 (SDE1/A, SDE2/A).

For each of the determined elements, the application software component may also be operative to retrieve from the data store corresponding CAD data (such as CAD files) that are usable to form 3D representations of the physical structures of the elements. In example embodiments, the data store may be capable of storing the CAD data, such as CAD files in data records of the data store. However, it should be appreciated that in other embodiments, the data store may correspond to a distributed system including a relational data base and a file server, in which the CAD data stored in the relational database specifies the particular CAD file to retrieve from a file server (or other type of data store). Further, it should be appreciated that example embodiments may place CAD data for each respective element of a routing run in separate CAD files and/or data records. However, in other configurations, CAD data for different elements may be independently retrievable from the same CAD file and/or CAD data record.

In addition, the routing path links may include information (e.g., handle data) which specifies which objects (e.g., ends, ports, connection points) in the CAD data for the specified pairs of elements that are to be connected together. The example application software component may be responsive to the CAD data for the elements and the data in the routing path links to dynamically render a 3D representation of the mechanical routing run 500 through a display device. Here the application software determines which elements to load and where to place and connect pairs of elements to dynamically assemble a virtual 3D representation of the routing run, based on the routing path links, the handle data (that specifies which portions of the elements to connect together), and the configurations/shapes of the elements defined in the CAD data for the elements. In example embodiments in which the routing path links are stored in a data store of a PLM system, such routing path links may correspond to objects stored in the PLM system which are managed by the described application software component (e.g., which may include CAD software).

Figure 7:
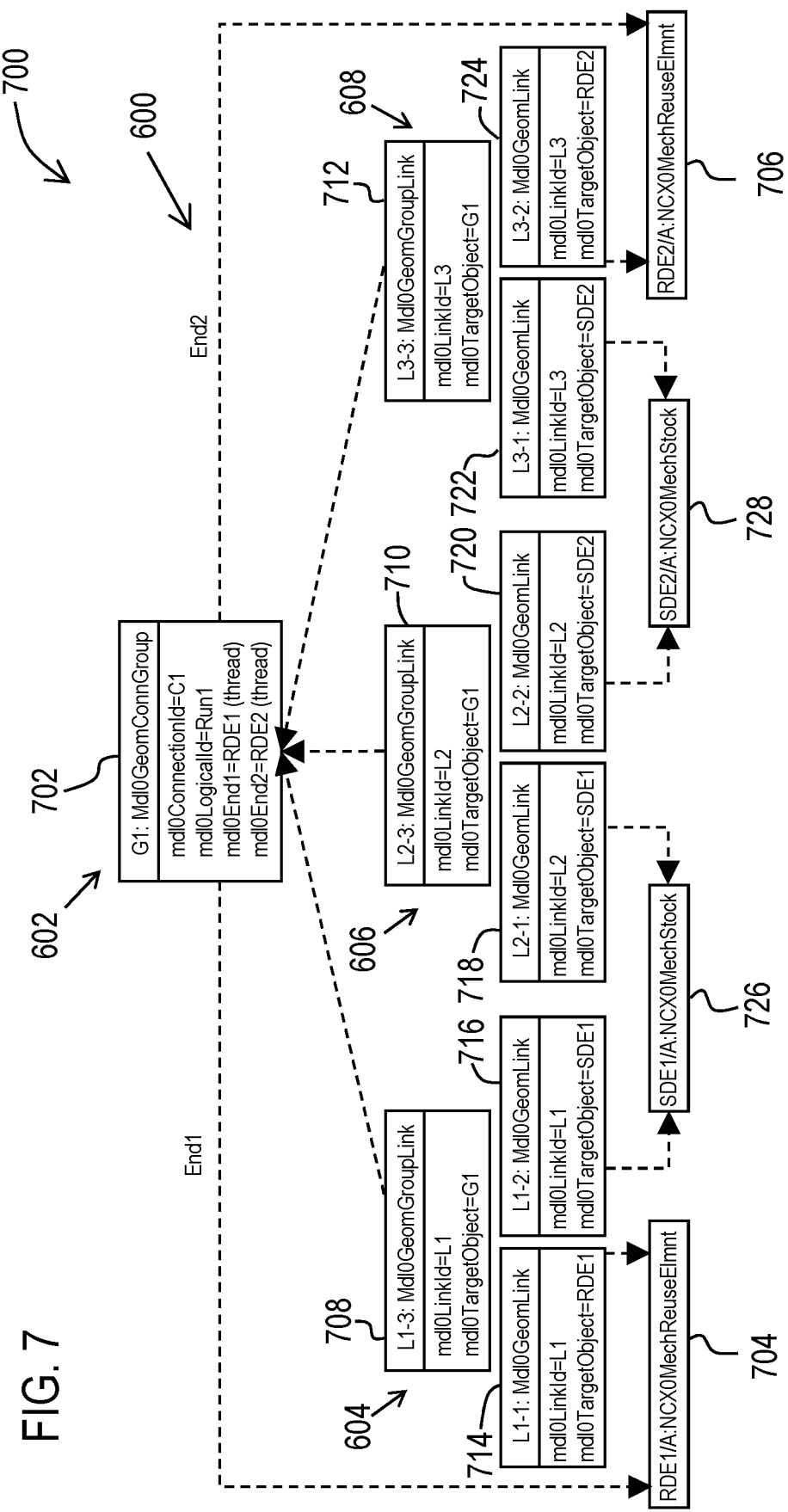

FIG. 7 illustrates a set of portions of data records 700 that may be stored in several tables in a data store of a PLM system in order to store the distributed routing path 600 for the mechanical routing run 500 shown in FIG. 5. In this example, the previously described routing path group 602 (G1) may be stored in a connection group record 702 which specifies the two previously described end elements (RDE1/A, RDE2/A) via specific references to component records 704, 706 stored in the data store for the end elements. Such component records may reference (via associations to other records in the data store) the specific CAD data to use to render a 3D representation of the physical structure of the element.

Also in this example, the previously described routing path links 604, 606, 608 (L1, L2, L3) may be stored as a combination of several associated link records in the data store. Such associated link records may include group link records 708, 710, 712 which reference the group record 702. Such associated link records may also include link element records 714 to 724 (two for each link L1, L2, L3) that respectively specify all of the elements of the distributed routing path via specific references to component records 704, 706 for the end components (RDE1/A, RDE2/A) and component references 726, 728 for the intermediate components (SDE1/A, SDE2/A) that are stored in the data store.

When the elements of the distributed routing path are configured and loaded by the application software component (such as by CAD software), the handle data of the routing path links may be processed to create a runtime 3D geometry constraints network in a memory. This network may allow the application software component to convert the user's interaction with the elements (via a GUI) into shape and position changes and also capture the changes to the routing path links between the elements.

All created/deleted/updated routing path links and CAD data may be persisted (i.e., stored) back into the data store of the PLM system by the application software component. The user may then load any ad-hoc collection (e.g., a subset) of connected elements of the distributed routing path into the application software component and be able to make design changes. Because, the elements are distributed in the manner described above in the data store, the application software component is able to load and manipulate only a sub-portion rather than the entire distributed routing path.

However, it should be appreciated that if only a sub-portion of a distributed routing path has one or more design changes, such design changes may or may not impact other portions of the distributed routing path that are not loaded. To assess the impact that design changes may have on other portions of the distributed routing path, example embodiments of the routing path links may include consistency data. For example, the application software component may be configured to store consistency data (such as a last modified date) in the associated link records in the data store which may be used to determine whether any design changes to one or more of the loaded elements causes a link between any two elements to be out of date and thus require the distributed routing path to be evaluated for consistency between the design changes and the elements that were not loaded.

As will be described in more detail below, such consistency data may change for a routing path link when the one of the pairs of elements specified by a link are revised by the application software component. By comparing the consistency information in routing path links, the described application software component may be operative to determine when a distributed routing path may need to be reevaluated to verify that all of the links and corresponding elements continue to define a working mechanical routing structure, if not, to flag a user that additional revisions to the elements may be needed to accommodate changes made to some of the elements.

Figure 8:
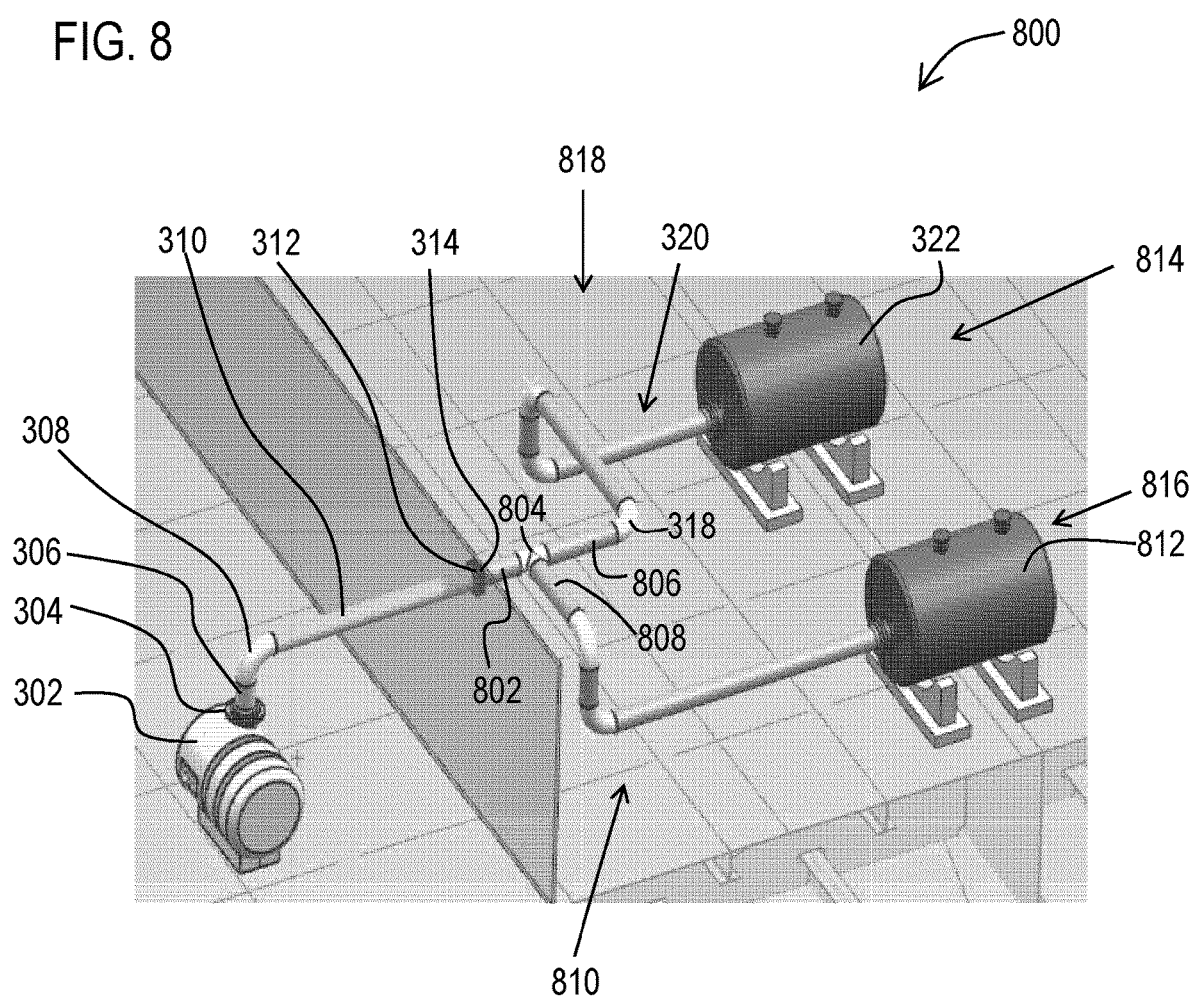
FIG. 8 illustrates an example 3D representation of a revised mechanical routing system with two pipeline routing runs.

FIG. 8 illustrates a 3D representation 800 of a physical structure for a mechanical routing system 818 that may be generated by revising the mechanical routing system 326 illustrated in FIG. 3. This second revision may be needed for example, for a different variant of the environmental space in which the routing system is needed. For example, the routing system 326 depicted in FIG. 3 may be for a hull of a first type of ship, while the routing system 818 depicted in FIG. 8 may be for a variation of the hull for a second type of ship.

In this revision the single pipeline routing run 324 (shown in FIG. 3) was modified via the application software component to include two pipeline routing runs 814, 816, that originate from the common end element of the pump 302, but split and respectively extend at two different end elements that respectively include the original first tank 322 and a new second tank 812.

In order to accomplish this revision with the application software component, a user may choose to retain much of the original routing system 326 as possible that is applicable to both variants. Thus both routing runs 814, 816 may retain the pump 302 and intermediate elements from the first flange 304 to the second flange 314. Also, the original second elbow 318, first tank 322, and additional intermediate elements 320 may also be retained in the new revision. However, to accommodate the second routing run 816, the original third pipe 316 (shown in FIG. 3) may be replaced (only for the second type of ship) with a set of two new smaller seventh and eighth pipes 802, 806 and a tee 804 therebetween. The second routing run 816 may then continue form the tee 804 and the user may use the application software component to add a ninth pipe 808, several additional intermediate elements 810 and the second tank 812.

In this example, as the user generates the new routing system 818, the application software component may be operative to generate new data objects and corresponding data records in the data store that correspond to new distributed routing paths for each of the first and second runs 814, 816. Such new distributed routing paths may include data objects for routing path links that remain unchanged from the original routing run 324. However, such new distributed routing paths will include new links for the connections for all of the new intermediate elements 802 to 810 and new end element 812, as well as new links for the connections between old intermediate elements (e.g., third flange 314, and second elbow 318) and the new intermediate structures (seventh and eight pipes 802, 806).

Figure 9:
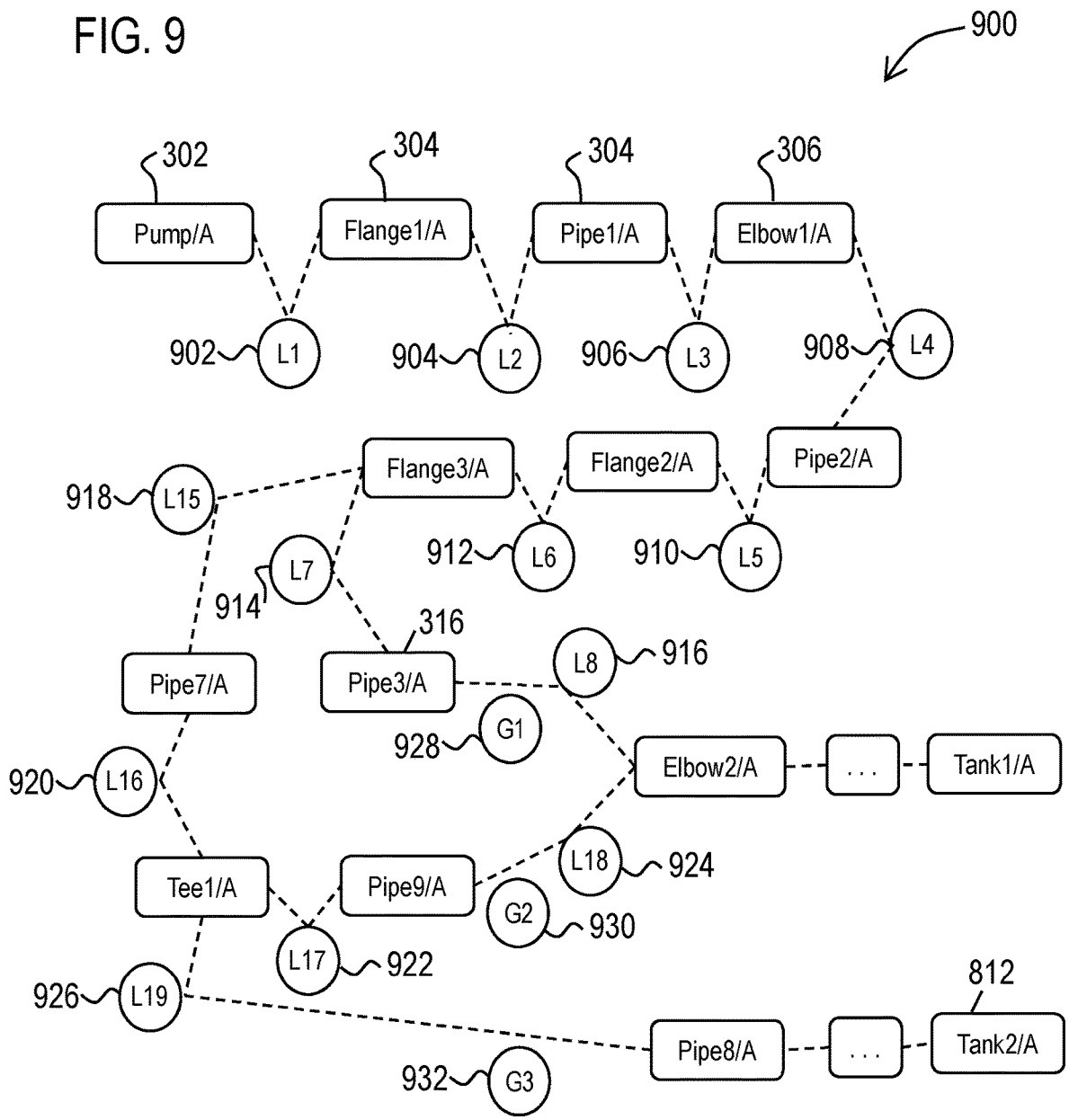
FIG. 9 illustrates a set of objects in a data store for several distributed routing paths for the original and revised mechanical routing system.

FIG. 9 illustrates a set of objects that may be stored in a data store that illustrates an example manner in which distributed routing paths 900 may be organized so as to be capable of representing both the single pipeline routing run 324 of the original routing system 324 in FIG. 3 and the two pipeline routing runs 814, 816 of the new routing system 818 shown in FIG. 8.

In this example, the data store may be directed to store routing path links 902-926 (L1 to L19) between the objects that represent the elements shown in FIGS. 3 and 8. The data store may also be directed to store three routing path groups 928, 930, 932 (G1, G2, G3) that correspond to the pipeline routing runs 324, 814, 816 shown in FIGS. 3 and 8. Links 902-912 (L1 to L6) are common to all three runs and thus may be associated with all three groups 928, 930, 932 (G1, G2, G3) that are directed to be stored in the data store. Links 918, 920 (L15, L16) are common to the two newer runs 814, 816 (shown in FIG. 8) and may be associated with only groups 930, 932 (G2, G3) in the data store. However, links 914, 916 (L7, L8), for example, may only be associated with the first routing path group 928 (G1). Similarly, links 922, 924 (L17, L18) may only be associated with the second routing path group 930 (G2). Also, link 926 (L19) may only be associated with the third routing path group 932 (G3).

With the addition of the new data for the routing system 818 (shown in FIG. 8), the "effectivity" of the original routing system 326 (shown in FIG. 3) may be cut back, so that it is effective for the first type of ship, but not the second type of ship. As a result, data for elements such as the third pipe 316 may only be applicable for the first type of ship, while data added for elements for the new routing system (e.g., the second tank 812) may only be applicable for the second type of ship. Also, even though both designs share many elements and routing path links, the addition of the second routing system 812 may not require the original routing system 326 to be revalidated. This follows because none of the original elements were revised and none of the routing path links for the distributed routing path for the original routing system 326 have become out of date or inconsistent with the addition of the new routing system 812 to the data store.

This example framework for storing objects in a data store may support a high level of concurrent design activities. For example, in a massive product such as a ship, a routing system can span across its entire length. The example framework enables multiple users (e.g., design engineers) to work on the 3D design at the same time without interfering with each other. The example framework also enables a user to work on portions of a design that are unique to a particular variant without the need to load elements that are shared among many variants of the design.

To carry out these features, the example application software component may enable sub-portions of the system to be distributed by "zones" or by sub-system to different users in order to refine the elements that are to be included in the portions of the routing paths that the users are designing. For example, the previously described routing run 324 shown in FIG. 3 may be associated with a first hull design while the second and third routing runs 814, 816 shown in FIG. 8 may be associated with a second hull design. The example framework enables different users to load different elements associated with the second and third routing runs of the second hull, without locking out the ability a third user to load and revise elements common to both the first and second hulls. Such features may reduce the costs of data management and validation of the design changes—and hence may increase productivity and reduce the overall costs of the product development process.

In an example embodiment, the described application software component may be configured to enable a user to create and modify a distributed routing path stored in the data store for a pipeline routing run being designed via a GUI (e.g., such as a GUI of a CAD software). Such software may enable a user to provide a name and description for the routing run and to define which end elements bound the pathway. In addition the software may enable a user to graphically insert and/or draw intermediate elements between the end elements which have a 3D representation through a display screen based on CAD data stored in the data store. FIGS. 3 and 8 represent example views of such 3D representations that may be displayed for the elements of routing runs being designed. Also, the software may in response to the selection and arrangement of the end elements and the intermediate elements generate the previously described routing path groups and links as objects that are stored as data records in the data store.

At a later time the software application component may enable a user to load all or portions of the elements of the routing path, in which case the application software component, responsive to the data in the data store, may regenerate a 3D representations of the elements of the routing path through a display screen. The software application component may further enable a user to modify aspects of some of the elements such as their sizes and shapes, which may be saved back to the data store as a revised version of the routing path. When such revisions are created, the application software component may be operative to generate and store new objects in the data store for the revisions to the elements and new routing path links which connect the new revised elements back to any of the unmodified elements from the previous version of the routing path.

However, as discussed previously, the user may choose to load only a subset of elements from the original version of the routing path to modify. Revisions to such loaded elements may or may not affect aspects of elements of the routing path that are not loaded. FIGS. 10-12 illustrate example processes in which such revisions may be handled by the described application software component.

For example, FIG. 10 represents a high level set of objects 1000 corresponding to the objects for the distributed routing path 600 shown in FIG. 6. In this example, the user may choose to use the application software component to only load the end element 502 (RDE1/A) and make revisions to this element to produce a revised end element 1002 (RDE1/B). In this illustration, solid line boxes represent elements that are loaded, while boxes in broken lines illustrate elements that are not loaded. Because the first intermediate element 504 (SDE1/A) is not loaded, the first routing path link 604 (L1) may represent a connection that could be inconsistent or introduce problems with the revised first intermediate element 1002 (SDE1/B). For example, the position of the port at which the first intermediate element is physically connected to the revised end element could have been moved, thus the current shape and/or length of the intermediate element might not be able to connect both the revised first end element and the second intermediate element 506 (SDE2/A).

In order to verify whether or not the first link 604 (L1) is valid (i.e. consistent between pairs of connected elements), it may be necessary for the user to also load both the revised first end element 1002 (RDE1/B) and the first intermediate element 504 (SDE1/A) in the application software component (e.g., CAD software). When this is done, the software component may be operative to compare last modified dates for the link associated with both the revised first end element and the first intermediate element. In this example, because only the first end element was loaded when the revision was made, the last modified date for the first link associated with the revised first end element will be newer than the last modified date for the first link associated with the first intermediate element. The application software component may be operative to detect the newer date and cause the GUI to provide some visible indicator that the connection between the revised first end element and the first intermediate element may need to be validated.

FIG. 11 illustrates an example 1100 of the objects for the distributed routing path after both the first revised end element 1002 (RDE1/B) and intermediate element 504 (SDE1/A) are loaded in the application software component, but the second intermediate element 506 (SDE2A) remains unloaded. In this example, the user may verify that the link between the revised first end element and the first intermediate element are good, and may cause the first link 604 (L1) to be updated so that the last modified dates are the same and indicate a good and consistent connection between these elements.

Also, in this example, the user may choose to revise the first intermediate element 504 (SDE1/A) (such as to make it longer) which produces a revised first intermediate element 1102 (SDE1/B). Because both the revised first end element 1002 (RDE1/B) and revised first intermediate element (SDE1/B) are loaded, the user may validate the connection between these elements, and the last modified dates for the first link 604 (L1) will match and indicate a good connection. However, because, the second intermediate element 506 (SDE2/A) is not loaded, the second link 606 (L2) may or may not be valid. Thus, to validate the second link, the user may load the second intermediate element 506 (SDE2/A).

FIG. 12 illustrates an example 1200 of the objects for the distributed routing path after the first revised end element 1002 (RDE1/B), the revised first intermediate element 1102 (SDE1/B), and the second intermediate element 506 (SDE2/A) are loaded in the application software component. In this example, the user may determine that the link between the revised first intermediate element and the second intermediate element has consistency issues (e.g., are not aligned). Thus the user may choose to revise the second intermediate element to produce a revised second intermediate element 1202 (SDE2/B) which is compatible with the revised first intermediate element 1102 (SDE1/B). An example embodiment of the application software component may be operative to detect that the second link 606 (L2) is not good (via mismatched last modified dates) and that the second intermediate element (which is part of the second link) has been revised. Responsive to this determination, the application software component may be configured to automatically create a new fourth link 1204 (L4) between the revised first and second intermediate elements 1102, 1202 (SDE1/B and SDE2/B).

It should also be appreciated that the application software component may enable a user to save a routing path as a new revised routing path that includes one or more revised elements. In this situation, the application software component may be configured to automatically generate new routing path links between any new revised elements and old elements which are not being revised (and that also remain in the original routing path).

For large projects, it should be appreciated that different users may be responsible for designing different design scopes of a structure). For example, a design manager may specify, at a high level, a logical design corresponding to a logical representation of generic components of a mechanical routing run and may leave the details regarding the design of the specific 3D structures needed to implement the logic design to other users. An example embodiment of the described application software component may include components capable of enabling users (via inputs through the input device) to generate both a logical routing run (via a logical designer component) as well as the 3D mechanical design for the logical run (via a 3D CAD software component).

Figure 13:
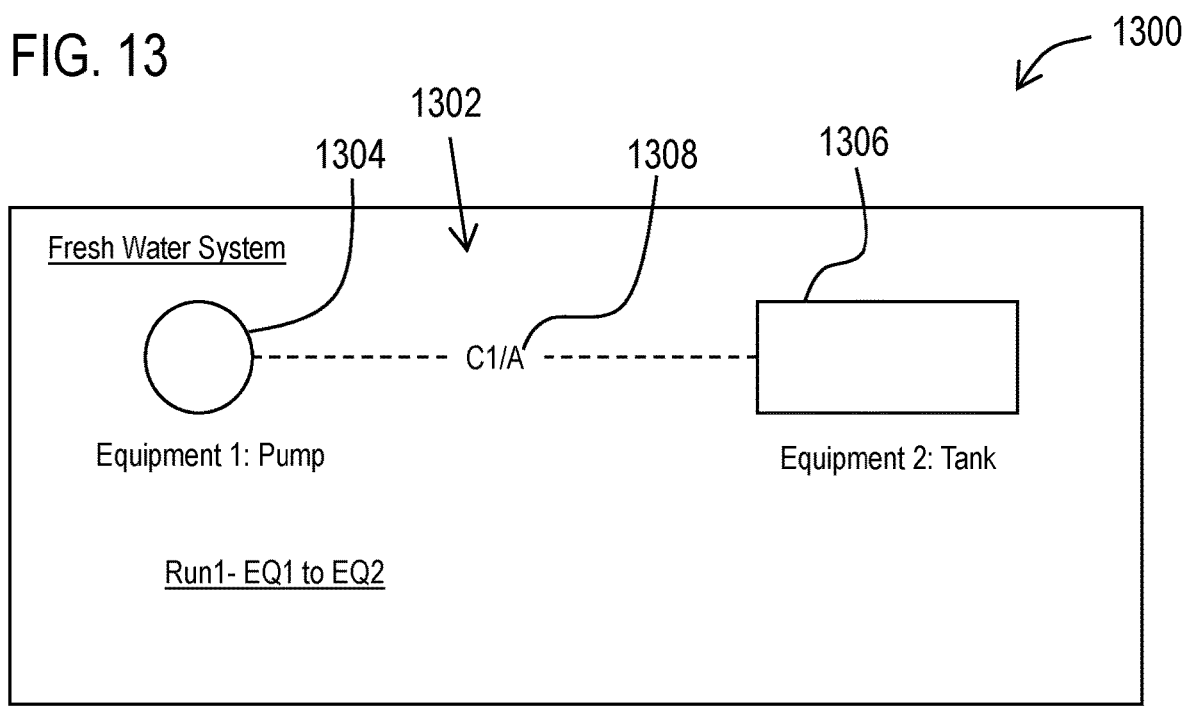
FIG. 13 illustrates an example of a logical routing design path.

FIG. 13 illustrates an example of an output 1300 from a GUI that may be generated by the application software component that corresponds to a logical routing design 1302 created using the application software component. Such a logical design may be for a logical run that corresponds to the pipeline routing run 324 shown in FIG. 3. Such a logical design may broadly define via 2D symbols and graphics for example, the need for a first equipment such as a pump 1304, a second equipment such as a tank 1306, and a generic connection 1308 (C1/A) therebetween. The application software component may be configured to save such a logical design 1302 to the data store. The user designing the physical pipeline routing run 324 via portions of the application software component, may use the logical design 1302 as a template and/or check list to capture all of the high level features from the logical design in a physical design that specifies the shapes of the components needed to fulfill the logical design.

Example embodiments of the application software may also enable a user to indicate that a logical design has been fulfilled by storing associations in the data store between the physical elements (i.e., data objects) stored as a distributed routing path in the data store and the corresponding logical components specified in the logical design. Such correlations between logical components and physical elements may be used by the application software component to enable a user to select and view corresponding physical designs elements for corresponding logical design components, when reviewing and validating design work being carried out for a project.

Figure 14:
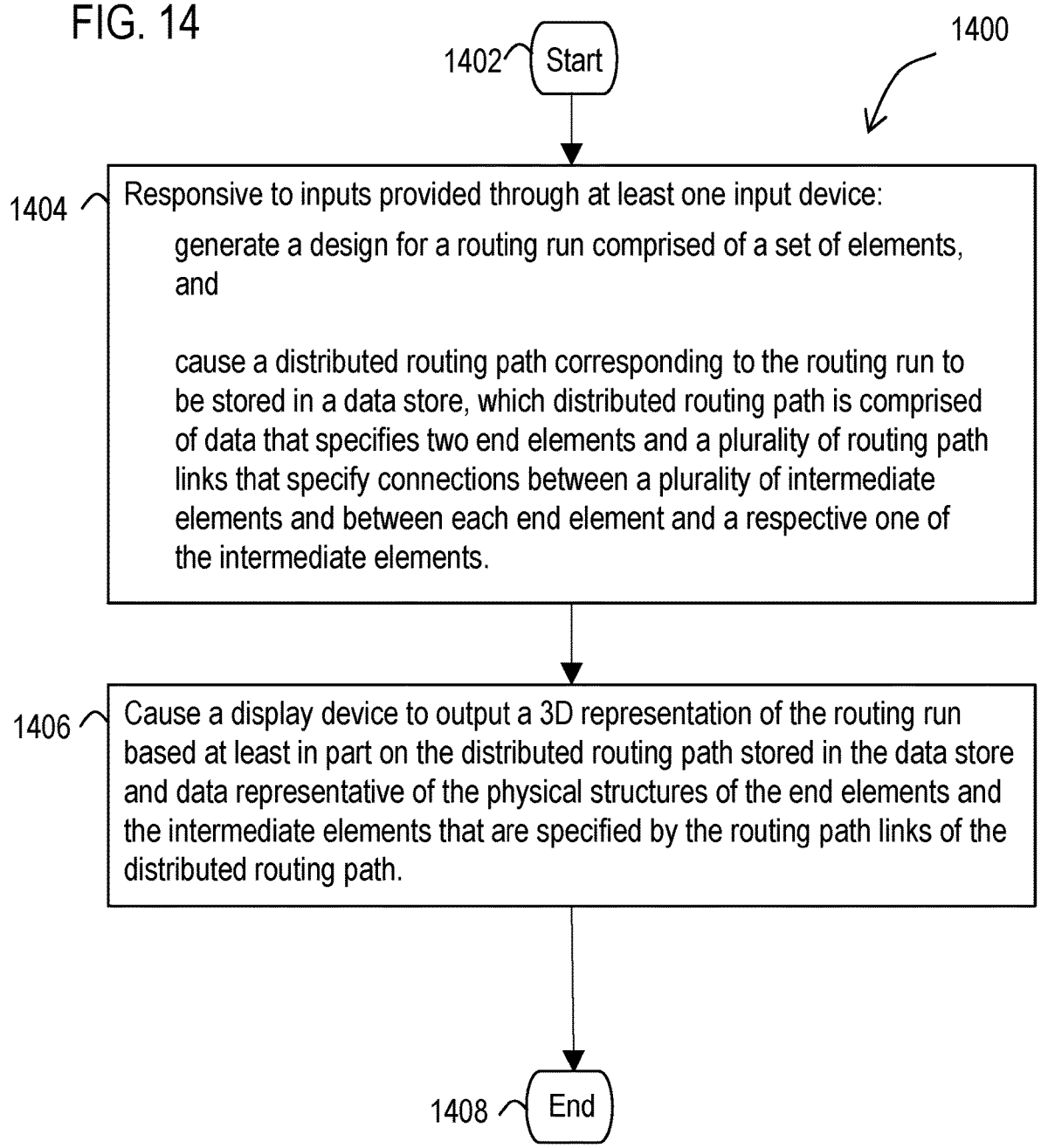
FIG. 14 illustrates a flow diagram of an example methodology that facilitates collaborative development of 3D virtual mechanical routing systems.

With reference now to FIG. 14, various example methodologies are illustrated and described. While the methodologies are described as being a series of acts that are performed in a sequence, it is to be understood that the methodologies may not be limited by the order of the sequence. For instance, some acts may occur in a different order than what is described herein. In addition, an act may occur concurrently with another act. Furthermore, in some instances, not all acts may be required to implement a methodology described herein.

It is important to note that while the disclosure includes a description in the context of a fully functional system and/or a series of acts, those skilled in the art will appreciate that at least portions of the mechanism of the present disclosure and/or described acts are capable of being distributed in the form of computer-executable instructions contained within non-transitory machine-usable, computer-usable, or computer-readable medium in any of a variety of forms, and that the present disclosure applies equally regardless of the particular type of instruction or signal bearing medium or storage medium utilized to actually carry out the distribution. Examples of non-transitory machine usable/readable or computer usable/readable mediums include: ROMs, EPROMs, magnetic tape, floppy disks, hard disk drives, SSDs, flash memory, CDs, DVDs, and Blu-ray disks. The computer-executable instructions may include a routine, a sub-routine, programs, applications, modules, libraries, a thread of execution, and/or the like. Still further, results of acts of the methodologies may be stored in a computer-readable medium, displayed on a display device, and/or the like.

Referring now to FIG. 14, a methodology 1400 that facilitates collaborative development of virtual mechanical routing is illustrated. The method may start at 1402 and the methodology may include several acts carried out through operation of at least one processor. These acts may include an act 1404 of responsive to inputs provided through at least one input device, generating a design for a routing run comprised of a set of elements and causing a distributed routing path corresponding to the routing run to be stored in a data store. In this example, the distributed routing path may be comprised of data that specifies two end elements and a plurality of routing path links that specify connections between a plurality of intermediate elements and between each end element and a respective one of the intermediate elements.

In addition, the methodology may include an act 1406 of causing a display device to output a 3D representation of the routing run based at least in part on the distributed routing path stored in the data store and data representative of the physical structures of the end elements and the intermediate elements that are specified by the routing path links of the distributed routing path. At 1408 the methodology may end.

It should be appreciated that the methodology 1400 may include other acts and features discussed previously with respect to the system 100. For example, the data representative of the physical structures of the end elements and the intermediate elements may include CAD data. The methodology may further include the processor loading CAD data from the data store corresponding to at least some of the elements of the distributed routing path so as to cause the display device to output 3D representations of the physical structures of the loaded elements placed together to form at least a portion of the 3D representation of the routing run based at least in part on at least a portion of the routing path links and the CAD data.

Also the methodology may include the processor forming in a memory a 3D geometry constraints network via which elements of the routing run are changeable in shape and position via inputs through the at least one input device. Further the methodology may include the processor creating, deleting, and/or updating the routing path links between the elements based on changes to the elements and storing changes to the routing path links and CAD data to the data store.

In example embodiments, the methodology may include the processor loading and making design changes to CAD data for a subset of the elements of the routing run, without requiring CAD data for all of the elements of the routing run to be loaded in the memory. Also the methodology main include the processor storing data in each routing path link in the data store which indicates whether the design changes require the routing run to be evaluated for consistency between the design changes and the elements that were not loaded. Further the methodology may include determining whether the routing path link between any two elements is out of date based at least in part on the data in the routing path links in the data store that indicates whether the design changes require the routing run to be evaluated for consistency.

With such acts, the example methodology may enable acts to be carried out in which first and second processors load and make design changes to different subsets of the elements of the routing run at the same time and store corresponding changes to the distributed routing path to the same data store.

In addition, in example embodiments, the CAD data may include CAD files respectively for each of the intermediate elements and end elements specified by the links of the distributed routing path. In addition, each routing path link may include handle data that specifies which CAD objects in the CAD data for pairs of elements specified in each routing path link are connected together In this described example the methodology may include determining which elements to load and where to place and connect pairs of elements to dynamically assemble a virtual 3D representation of the routing run, based on the pairs of elements specified in the routing path links, the handle data included in the routing path links, and configurations of the elements defined in the CAD data for the elements specified by the routing path links.

Also, the example methodology may include the processor responsive to inputs provided through the at least one input device, generating a design of a logical representation of the routing run that specifies logical components to use to implement the routing run. In addition, the methodology may include the processor responsive to inputs provided through the at least one input device, storing in the data store data representative of the logical representation being fulfilled via associations between the logical components and the end and intermediate elements specified by the distributed routing path.

As discussed previously, the routing run that is being designed via these described acts may include a pipeline that moves a fluid between the end elements in the form of pipeline equipment. Once the design is created and stored in the data store, further example methodologies may carry out acts that use the designed routing run.

Such acts may include generating (based on the distributed routing path and CAD data in the data store) engineering drawings and/or a BOM that specifies particular component (and quantities thereof) that may be used to build the routing run on/in a physical structure such as a ship, aircraft, building, or other structure. Such engineering drawings and/or BOM may be printed via a printer on paper, generated in an electronic form such as a Microsoft Excel file or Acrobat PDF, displayed via a display device, communicated in an e-mail, stored in a data store, or otherwise generated in a form capable of being used by a individuals to build a pipeline corresponding to the designed routing run. Further, the methodology may include individuals manually building the pipeline routing run based on the engineering drawings and/or BOM.

As discussed previously, acts associated with these methodologies (other than the described act of manually building a routing run) may be carried out by one or more processors. Such processor(s) may be included in one or more data processing systems, for example, that execute software components operative to cause these acts to be carried out by the one or more processors. In an example embodiment, such software components may be written in software environments/languages/frameworks such as Java, JavaScript, Python, C, C #, C++ or any other software tool capable of producing components and graphical user interfaces configured to carry out the acts and features described herein.

Figure 15:
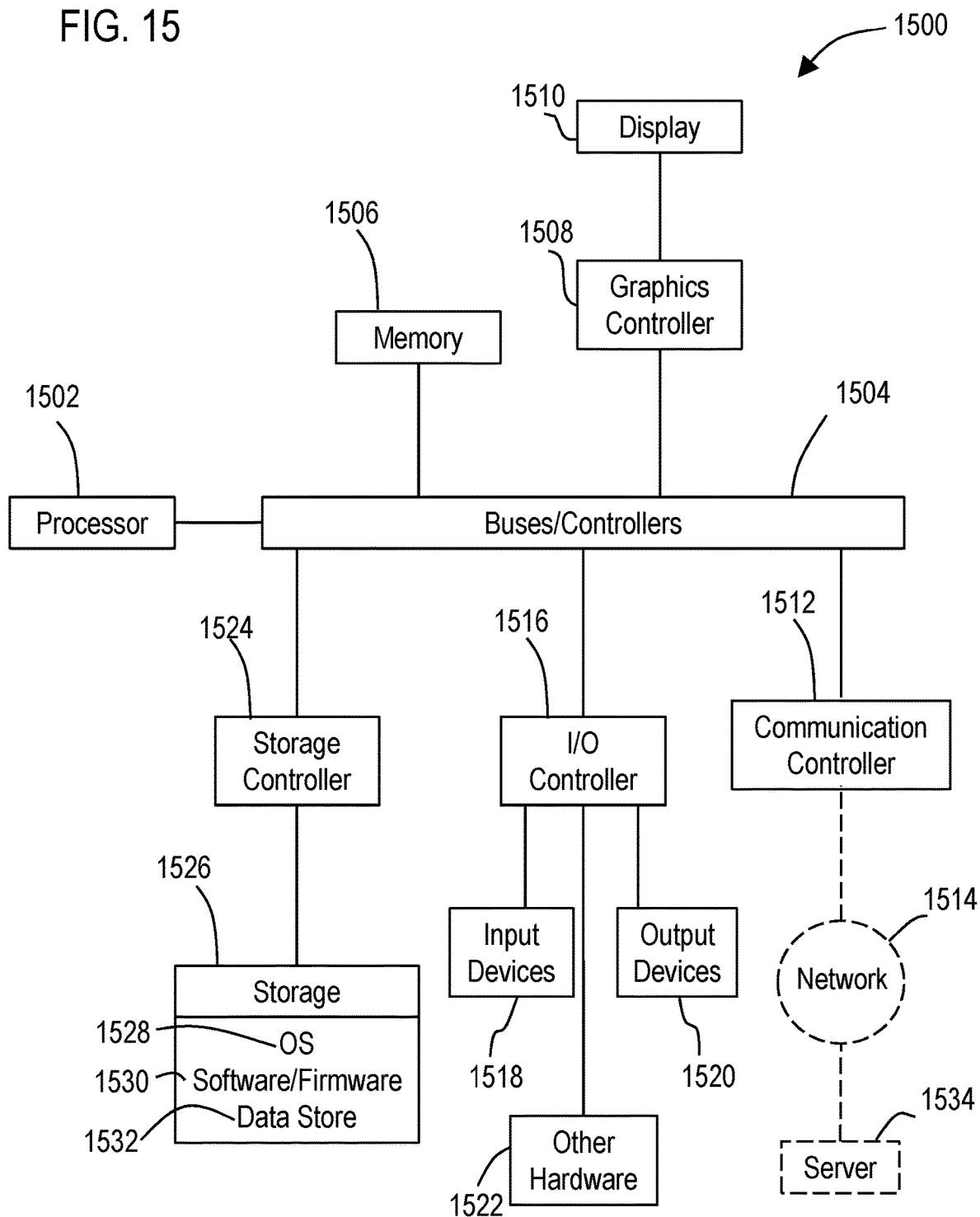
FIG. 15 illustrates a block diagram of a data processing system in which an embodiment can be implemented.

FIG. 15 illustrates a block diagram of a data processing system 1500 (also referred to as a computer system) in which an embodiment can be implemented, for example, as a portion of a PLM, CAD, and/or other system operatively configured by software or otherwise to perform the processes as described herein. The data processing system depicted includes at least one processor 1502 (e.g., a CPU) that may be connected to one or more bridges/controllers/buses 1504 (e.g., a north bridge, a south bridge). One of the buses 1504, for example, may include one or more I/O buses such as a PCI Express bus. Also connected to various buses in the depicted example may include a main memory 1506 (RAM) and a graphics controller 1508. The graphics controller 1508 may be connected to one or more display devices 1510. It should also be noted that in some embodiments one or more controllers (e.g., graphics, south bridge) may be integrated with the CPU (on the same chip or die). Examples of CPU architectures include IA-32, x86-64, and ARM processor architectures.

Other peripherals connected to one or more buses may include communication controllers 1512 (Ethernet controllers, WiFi controllers, cellular controllers) operative to connect to a local area network (LAN), Wide Area Network (WAN), a cellular network, and/or other wired or wireless networks 1514 or communication equipment.

Further components connected to various busses may include one or more I/O controllers 1516 such as USB controllers, Bluetooth controllers, and/or dedicated audio controllers (connected to speakers and/or microphones). It should also be appreciated that various peripherals may be connected to the USB controller (via various USB ports) including input devices 1518 (e.g., keyboard, mouse, touch screen, trackball, gamepad, camera, microphone, scanners, motion sensing devices), output devices 1520 (e.g., printers, speakers) or any other type of device that is operative to provide inputs or receive outputs from the data processing system. Further it should be appreciated that many devices referred to as input devices or output devices may both provide inputs and receive outputs of communications with the data processing system. Further it should be appreciated that other peripheral hardware 1522 connected to the I/O controllers 1516 may include any type of device, machine, or component that is configured to communicate with a data processing system.

Additional components connected to various busses may include one or more storage controllers 1524 (e.g., SATA). A storage controller may be connected to a storage device 1526 such as one or more storage drives and/or any associated removable media, which can be any suitable non-transitory machine usable or machine readable storage medium. Examples, include nonvolatile devices, volatile devices, read only devices, writable devices, ROMs, EPROMs, magnetic tape storage, floppy disk drives, hard disk drives, solid-state drives (SSDs), flash memory, optical disk drives (CDs, DVDs, Blu-ray), and other known optical, electrical, or magnetic storage devices drives and/or computer media. Also in some examples, a storage device such as an SSD may be connected directly to an I/O bus 1504 such as a PCI Express bus.

A data processing system in accordance with an embodiment of the present disclosure may include an operating system 1528, software/firmware 1530, and data stores 1532 (that may be stored on a storage device 1526 and/or the memory 1506). Such an operating system may employ a command line interface (CLI) shell and/or a graphical user interface (GUI) shell. The GUI shell permits multiple display windows to be presented in the graphical user interface simultaneously, with each display window providing an interface to a different application or to a different instance of the same application. A cursor or pointer in the graphical user interface may be manipulated by a user through a pointing device such as a mouse or touch screen. The position of the cursor/pointer may be changed and/or an event, such as clicking a mouse button or touching a touch screen, may be generated to actuate a desired response. Examples of operating systems that may be used in a data processing system may include Microsoft Windows, Linux, UNIX, iOS, and Android operating systems. Also, examples of data stores include data files, data tables, relational database (e.g., Oracle, Microsoft SQL Server), database servers, or any other structure and/or device that is capable of storing data which is retrievable by a processor.

The communication controllers 1512 may be connected to the network 1514 (not a part of data processing system 1500), which can be any public or private data processing system network or combination of networks, as known to those of skill in the art, including the Internet. Data processing system 1500 can communicate over the network 1514 with one or more other data processing systems such as a server 1534 (also not part of the data processing system 1500). However, an alternative data processing system may correspond to a plurality of data processing systems implemented as part of a distributed system in which processors associated with several data processing systems may be in communication by way of one or more network connections and may collectively perform tasks described as being performed by a single data processing system. Thus, it is to be understood that when referring to a data processing system, such a system may be implemented across several data processing systems organized in a distributed system in communication with each other via a network.

Further, the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely.

In addition, it should be appreciated that data processing systems may be implemented as virtual machines in a virtual machine architecture or cloud environment. For example, the processor 1502 and associated components may correspond to a virtual machine executing in a virtual machine environment of one or more servers. Examples of virtual machine architectures include VMware ESCi, Microsoft Hyper-V, Xen, and KVM.

Those of ordinary skill in the art will appreciate that the hardware depicted for the data processing system may vary for particular implementations. For example, the data processing system 1500 in this example may correspond to a computer, workstation, and/or a server. However, it should be appreciated that alternative embodiments of a data processing system may be configured with corresponding or alternative components such as in the form of a mobile phone, tablet, controller board or any other system that is operative to process data and carry out functionality and features described herein associated with the operation of a data processing system, computer, processor, and/or a controller discussed herein. The depicted example is provided for the purpose of explanation only and is not meant to imply architectural limitations with respect to the present disclosure.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

Also, as used herein a processor corresponds to any electronic device that is configured via hardware circuits, software, and/or firmware to process data. For example, processors described herein may correspond to one or more (or a combination) of a microprocessor, CPU, FPGA, ASIC, or any other integrated circuit (IC) or other type of circuit that is capable of processing data in a data processing system, which may have the form of a controller board, computer, server, mobile phone, and/or any other type of electronic device.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 1500 may conform to any of the various current implementations and practices known in the art.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element which must be included in the claim scope: the scope of patented subject matter is defined only by the allowed claims. Moreover, none of these claims are intended to invoke 35 USC § 112(f) unless the exact words "means for" are followed by a participle.

What is claimed is:

1. A system comprising:
    at least one processor configured to:
        receive user inputs provided through at least one input device from a user interaction with a graphical user interface;
        generate a design for a routing run, in response to the user inputs, comprised of a set of elements and cause a distributed routing path corresponding to the routing run to be stored in a data store, which distributed routing path is comprised of data that specifies two end elements and a plurality of routing path links that specify connections between a plurality of intermediate elements and between each end element and a respective one of the intermediate elements,
            wherein the data store further includes data representative of the physical structures of the end elements and the intermediate elements that are specified by the routing path links of the distributed routing path, including computer-aided-design (CAD) data,
            wherein each routing path link includes handle data that specifies which CAD objects in the CAD data for pairs of elements specified in each routing path link are connected together;
        determine which elements to load and where to place and connect pairs of elements to dynamically assemble a virtual 3D representation of the routing run, based on the pairs of elements specified in the routing path links, the handle data included in the routing path links, and configurations of the elements defined in the CAD data for the elements specified by the routing path links;
        dynamically assemble the virtual 3D representation of the routing run according to the determination; and
        display the virtual 3D representation of the routing run on a display device.

2. The system according to claim 1, wherein the system includes an application software component having instructions executable by the at least one processor that cause the processor to load the CAD data from the data store corresponding to at least some of the elements of the distributed routing path so as to cause the display device to output 3D representations of the physical structures of the loaded elements placed together to form at least a portion of the 3D representation of the routing run based at least in part on at least a portion of the routing path links and the CAD data,
   wherein the application software component is configured to form in a memory of the system a 3D geometry constraints network via which elements of the routing run are changeable in shape and position via inputs through the at least one input device,
   wherein the application software component is configured to create, delete, and/or update the routing path links between the elements based on changes to the elements and store changes to the routing path links and CAD data to the data store.

3. The system according to claim 2, wherein the application software component is configured to load and make design changes to CAD data for a subset of the elements of the routing run, without requiring CAD data for all of the elements of the routing run to be loaded in the memory by the application software component,
   wherein the application software component is configured to store data in each routing path link in the data store which indicates whether the design changes require the routing run to be evaluated for consistency between the design changes and the elements that were not loaded.

4. The system according to claim 3, wherein the data in the routing path links in the data store that indicates whether the design changes require the routing run to be evaluated for consistency includes data that facilitates the processor determining whether the routing path link between any two elements is out of date.

5. The system according to claim 1, wherein the at least one processor includes a first and a second processor included respectfully in a first and a second computer system each configured to execute a first and a second instance of the application software component, such that the first and second computer systems load and make design changes to different subsets of the elements of the routing run and store corresponding changes to the distributed routing path to the same data store.

6. The system according to claim 1, wherein the CAD data includes CAD files respectively for each of the intermediate elements and end elements specified by the links of the distributed routing path.

7. The system according to claim 1, wherein the at least one processor is configured to be responsive to the user inputs to generate a design for a logical representation of the routing run that specifies logical components to use to implement the routing run,
   wherein the processor is configured to be responsive the user inputs to store in the data store data representative of the logical representation being fulfilled via associations between the logical components and the end and intermediate elements specified by the distributed routing path.

8. The system according to claim 1, wherein the routing run includes a pipeline that moves a fluid between the end elements in the form of pipeline equipment.

9. The system according to claim 1, further comprising a computer system including a memory, an application software component, the at least one processor, the at least one input device, the display device, and the data store,
   wherein the application software component is comprised of instructions that when included in the memory and executed by the at least one processor, cause the at least one processor responsive to the user inputs to generate the design for the routing run and determine and store the distributed routing path in the data store.

10. A method comprising:
through operation of at least one processor:
receiving user inputs provided through at least one input device from a user interaction with a graphical user interface;
generating a design for a routing run, in response to the user inputs, comprised of a set of elements and causing a distributed routing path corresponding to the routing run to be stored in a data store, which distributed routing path is comprised of data that specifies two end elements and a plurality of routing path links that specify connections between a plurality of intermediate elements and between each end element and a respective one of the intermediate elements,
   wherein the data store further includes data representative of the physical structures of the end elements and the intermediate elements that are specified by the routing path links of the distributed routing path, including computer-aided-design (CAD) data,
   wherein each routing path link includes handle data that specifies which CAD objects in the CAD data for pairs of elements specified in each routing path link are connected together;
determining which elements to load and where to place and connect pairs of elements to dynamically assemble a virtual 3D representation of the routing run, based on the pairs of elements specified in the routing path links, the handle data included in the routing path links, and configurations of the elements defined in the CAD data for the elements specified by the routing path links;
dynamically assembling the virtual 3D representation of the routing run according to the determination; and
displaying the virtual 3D representation of the routing run on a display device.

11. The method according to claim 10, further comprising:
through operation of the at least one processor, loading CAD data from the data store corresponding to at least some of the elements of the distributed routing path so as to cause the display device to output 3D representations of the physical structures of the loaded elements placed together to form at least a portion of the 3D representation of the routing run based at least in part on at least a portion of the routing path links and the CAD data;
through operation of the at least one processor, forming in a memory a 3D geometry constraints network via which elements of the routing run are changeable in shape and position via the user inputs,
through operation of the at least one processor, creating, deleting, and/or updating the routing path links between the elements based on changes to the elements and storing changes to the routing path links and CAD data to the data store.

12. The method according to claim 11, further comprising:
through operation of the at least one processor, loading and making design changes to CAD data for a subset of the elements of the routing run, without requiring CAD data for all of the elements of the routing run to be loaded in the memory; and
through operation of the at least one processor, storing data in each routing path link in the data store which indicates whether the design changes require the routing run to be evaluated for consistency between the design changes and the elements that were not loaded.

13. The method according to claim 12, further comprising:
through operation of the at least one processor, determining whether the routing path link between any two elements is out of date based at least in part on the data in the routing path links in the data store that indicates whether the design changes require the routing run to be evaluated for consistency.

14. The method according to claim 10, wherein the at least one processor includes a first and a second processor, further comprising:
through operation of the first and second processors, concurrently loading and making design changes to different subsets of the elements of the routing run at the same time and storing corresponding changes to the distributed routing path to the same data store.

15. The method according to claim 10, wherein the CAD data includes CAD files respectively for each of the intermediate elements and end elements specified by the links of the distributed routing path.

16. The method according to claim 10, further comprising:
through operation of the at least one processor, responsive to the user inputs, generating a design of a logical representation of the routing run that specifies logical components to use to implement the routing run; and
through operation of the at least one processor, responsive to the user inputs, storing in the data store data representative of the logical representation being fulfilled via associations between the logical components and the end and intermediate elements specified by the distributed routing path.

17. The method according to claim 10, wherein the routing run includes a pipeline that moves a fluid between the end elements in the form of pipeline equipment, further comprising:
building a pipeline corresponding to the routing run based at least in part on the distributed routing path and the CAD data.

18. A non-transitory computer readable medium encoded with executable instructions that when executed, cause at least one processor to carry out a method comprising:

receiving user inputs provided through at least one input device from a user interaction with a graphical user interface;

generating a design for a routing run, in response to the user inputs, comprised of a set of elements and causing a distributed routing path corresponding to the routing run to be stored in a data store, which distributed routing path is comprised of data that specifies two end elements and a plurality of routing path links that specify connections between a plurality of intermediate elements and between each end element and a respective one of the intermediate elements, wherein the data store further includes data representative of the physical structures of the end elements and the intermediate elements that are specified by the routing path links of the distributed routing path, including computer-aided-design (CAD) data, wherein each routing path link includes handle data that specifies which CAD objects in the CAD data for pairs of elements specified in each routing path link are connected together;

determining which elements to load and where to place and connect pairs of elements to dynamically assemble a virtual 3D representation of the routing run, based on the pairs of elements specified in the routing path links, the handle data included in the routing path links, and configurations of the elements defined in the CAD data for the elements specified by the routing path links;

dynamically assembling the virtual 3D representation of the routing run according to the determination; and causing a display device to output the virtual 3D representation of the routing run.

* * * * *